(12) United States Patent
Kaku

(10) Patent No.: US 7,050,505 B2
(45) Date of Patent: May 23, 2006

(54) ALIASING AND ROUTING OF PLURAL MPEG DATA STREAMS

(75) Inventor: Vicky B. Kaku, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 546 days.

(21) Appl. No.: 10/213,833

(22) Filed: Aug. 6, 2002

(65) Prior Publication Data

US 2003/0048854 A1    Mar. 13, 2003

Related U.S. Application Data

(60) Provisional application No. 60/322,077, filed on Sep. 13, 2001.

(51) Int. Cl.
*H04N 7/12* (2006.01)

(52) U.S. Cl. .................................. 375/240.29; 370/429

(58) Field of Classification Search ............ 375/240.29, 375/240.28, 240.01; 370/429, 464, 476, 370/360; 348/423.1, 714–716; 715/736
See application file for complete search history.

(56) References Cited

U.S. PATENT DOCUMENTS

| | | | | |
|---|---|---|---|---|
| 5,898,695 | A * | 4/1999 | Fujii et al. ................... | 370/464 |
| 6,002,687 | A | 12/1999 | Magee et al. | |
| 6,091,772 | A | 7/2000 | Anderson et al. | |
| 6,201,815 | B1 * | 3/2001 | Nomura ....................... | 370/429 |
| 6,252,872 | B1 * | 6/2001 | Tzeng ......................... | 370/360 |
| 6,804,259 | B1 * | 10/2004 | Onagawa ..................... | 370/476 |
| 6,823,131 | B1 * | 11/2004 | Abelard et al. ............... | 386/68 |
| 6,839,070 | B1 * | 1/2005 | Meandzija et al. ......... | 715/736 |

FOREIGN PATENT DOCUMENTS

| | | |
|---|---|---|
| EP | 0 844 763 | 5/1998 |
| WO | WO 97/20413 | 6/1997 |
| WO | 99/37048 | 7/1999 |
| WO | WO 01/15455 | 3/2001 |
| WO | 01/45417 | 6/2001 |

OTHER PUBLICATIONS

*Datasheets: CPX8216,* CPX8000 Family, Motorola, Sep. 2001 (12 pages).

(Continued)

*Primary Examiner*—Gims Philippe
(74) *Attorney, Agent, or Firm*—Robert P. Marley

(57) ABSTRACT

Aliasing and routing of plural MPEG data streams are disclosed. Disclosed apparatus embodiments include, e.g., a router or a cross-point switch that can route data packets from any source location(s) to any destination location(s). Such locations may be on multiple targets on a single processing board or may be on multiple boards in a chassis with a backplane linking the boards together. The disclosed aliasing and routing is achieved by processing MPEG data streams with associated PIDs so they can be transported between communicatively linked locations. This is achieved by generating a PID alias table with plural PID aliases for each input data stream; by removing at least one PID from each input data stream to thereby produce filtered data streams; by determining target destination(s) for each of the filtered data streams; and by buffering the filtered data streams so the filtered data streams can then be read and transported to respective target destination(s).

10 Claims, 11 Drawing Sheets

OTHER PUBLICATIONS

Advanced Television Systems Committee (ATSC), *ATSC Standard: Delivery of IP Multicast Sessions over Broadcast,* Doc. A/92, Jan. 31, 2002, pp. 1-42.

Mack, B., Society of Cable Telecommunications Engineers, Inc. (SCTE), *ATVEF Binding for Digital MPEG Networks,* SCTE DVS 311, Feb. 2, 2000, pp. 1-13.

Crinon, R.J, *ATSC Data Broadcast Services: Protocols, Application Signaling, Buffer Models, Profiles and Levels,* International Conference on Consumer Electronics (ICCE), IEEE, Jun. 22, 1999, pp. 4-5.

Advanced Television Systems Committee (ATSC), *ATSC Data Broadcast Standard,* Doc. A/90, Jul. 26, 2000, pp. 1-94.

Clausen, Horst D., et al., *MPEG-2 as a Transmission System for Internet Traffic,* IEEE International Performance, Computing and Communications Conference (IPCCC), Feb. 16-18, 1998, pp. 101-107.

*ATSC IP Multicast Data Standard (Draft),* Doc. S13-12r5, Draft 05, Jan. 23, 2001, pp. i-iii, 1-13, 16, 35-36.

Terayon Communication Systems Product Brochure, *Cherrypicker 500,* Nov. 2000.

Terayon Communication Systems Product Brochure, *Cherrypicker 600,* Nov. 2000.

Terayon Communication Systems Product Brochure, *Cherrypicker Ad Splicer,* Nov. 2000.

Terayon Communication Systems Product Brochure, *Cherrypicker National Control,* Nov. 2000.

Terayon Communication Systems Product Brochure, *Cherrypicker GUI,* Apr. 2001.

Bigband Networks, Inc. Product Brochure, *BMR 100 Broadband Multimedia-Service Router for Cable Networks,* 2000.

Bigband Networks, Inc. Product Brochure, *BMR 1200 Broadband Multimedia-Service Router for Cable Networks,* 2000.

Bigband Networks, Inc. Product Brochure, *BMR Management Suite,* 2001.

Bigband Networks, Inc. Promotional Article, *The BMR-100—Next Generation Grooming,* www.bigbandnet.com/popup/bmr.htm, 3 pages, publication date unknown.

\* cited by examiner

ALIASING AND ROUTING OF PLURAL MPEG DATA STREAMS

CROSS REFERENCE TO RELATED APPLICATION

This application claims the benefit under 35 U.S.C. § 119(e) of co-pending U.S. Provisional Application, Ser. No. 60/322,077, filed Sep. 13, 2001 and entitled "HIGH RATE SERIAL DIFFERENTIAL PROTOCOL FOR PACKETIZED DATA ROUTING"; which Provisional Application is hereby incorporated by reference.

BACKGROUND OF THE INVENTION

1. Field of the Invention

The present invention is directed to systems, methods, protocols, apparatus and related software for high-speed data communications. More particularly, the invention relates to the aliasing and routing of plural MPEG data streams. Accordingly, the general objects of the invention are to provide novel systems, methods, apparatus and software of such character.

2. Description of the Related Art

With the rise of the information age in recent years, digital communications hardware has become much more sophisticated and specialized in an effort to satisfy the ever-increasing demand for faster delivery of information and for information transfer options. For example, the typical modern communications system may include one or more signal receivers, decoders, modulators, data servers, streaming video servers, transaction, billing and conditional access processors, communication controllers and/or broadband media routers. Broadband media routers and/or Transport Multiplexers (TMXs) are particularly important and are generally used to multiplex data streams or to re-multiplex data streams that have previously been multiplexed. More specifically, they are used to groom multiple transport streams, such as MPEG encoded video streams (MPEG is an acronym for Moving Picture Experts Group and is generically used herein to refer to the various adopted versions of that protocol, e.g., MPEG1, MPEG2, etc.), and to thereby produce output streams for video appliances such as digital televisions, personal versatile recorders (PVR), and the like. This grooming can include, for example, transcoding, advertisement insertion, adding IP opportunistic data, re-multiplexing incoming services to provide a new channel line-up, etc.

Broadband media routers typically comprise various hardware components and, since it is necessary to communicate signals between these various components, these components must be communicatively linked together. This is typically achieved with the use of a backplane which is a circuit board that interconnects components situated on shelves within a rack or chassis. Custom backplane designs have been the typical solution for interconnecting components in a particular way in order to achieve the desired functionality. Such custom designs incorporate discrete hardware to send data in parallel form between the different components (e.g., circuit boards) connected by the backplane. While effective to a degree, these custom designs are expensive, single use solutions and are, therefore, neither efficient nor cost-effective. They, additionally, are bandwidth limited, which poses limitations on the systems with which they are used.

Further, there is an ever-increasing need for faster and more flexible transport of digital data streams regardless of whether such transport occurs between locations on different processing boards or between locations on the same processing board. There is also an ever-increasing need to transport more and more input data streams to more and more target destinations at faster and faster rates.

There is, accordingly, a need in the art for novel methods, systems and apparatus that provide faster and more flexible transport of MPEG data streams between locations on different processing boards and/or between locations on a single processing board. It would also be advantageous to provide a scheme for a large number (e.g., ten) of MPEG input data streams to a large number of selected target destinations. It would be further advantageous to provide methods and apparatus for routing packetized data without the need to make major hardware modifications to existing components of, e.g., a TMX. The present invention provides a solution having the aforementioned and other advantages.

SUMMARY OF THE INVENTION

One form of the present invention satisfies the above-stated needs and overcomes the above-stated and other deficiencies of the related art by providing methods of aliasing plural MPEG data streams and routing them to one or more target destinations. For example, ten input data streams may be routed to any one or more of twelve different locations. Such locations may, for example, be on multiple targets on a single board within a chassis. Alternatively, the locations may be on multiple boards in a chassis with a backplane linking the boards together. These embodiments include generating a PID alias table with plural PID aliases for each of the input data streams and removing at least one PID from each input data stream to thereby produce filtered data streams. These methods also entail determining a target destination for each of the filtered data streams and buffering the filtered data streams so the filtered data streams can be read and transported to respective target destinations or locations. In a preferred embodiment, buffering can be achieved by populating a wagon wheel memory structure with the filtered data streams. Where there are N filtered data streams, populating the wagon wheel memory structure preferably includes providing a wagon wheel memory structure having 2N time slots to accommodate corresponding write and read cycles for each of the N filtered data streams, and then sequentially populating write-cycle time slots with respective ones of the data streams. To assist data recovery from the buffer, pointers for each of the read-cycle and write-cycle time slots of the memory structure may be maintained.

Other method embodiments of the invention envision recovering the filtered data streams from the memory structure, generating a master clock rate based on the recovered data streams and serially transporting the recovered MPEG data streams to a destination at the master clock rate. In such embodiments, data recovery can take the form of reading the filtered data streams from respective read-cycle time slots such that N data streams are recovered from the memory structure.

Still other method embodiments of the invention are directed to transporting MPEG data packets between communicatively linked locations. Such locations may, for example, be on multiple targets on a single board within a chassis. Alternatively, the locations may be on multiple boards in a chassis with a backplane linking the boards together. Such methods entail receiving plural input streams (with associated PIDs), providing the input streams to a round robin memory scheme, reading the data from the memory and transmitting the data to one or more destinations. The round robin memory preferably has first and second memory modules in which the first memory module can be used to associate plural PID aliases with each of the input streams and the second memory module can be used to buffer the input data streams. In such embodiments, the buffered data streams are read from the second memory module and serially transmitted as low voltage differential signals to the destination(s). The invention is also capable of accommodating plural input streams of differing data rates. When such input streams are received, they are first synchronized to a common clock frequency such as 27 MHz. Processing then proceeds as described above.

Corresponding apparatus forms of the invention (e.g., a router, a TMX or a cross-point switch that can route data packets from any source to any destination) are directed to processing MPEG data streams with associated PIDs so they can be transported between locations which are communicatively linked together. Such locations may, for example, be on multiple targets on a single board within a chassis. Alternatively, the locations may be on multiple boards in a chassis with a backplane linking the boards together. The inventive apparatus includes means for generating a PID alias table with plural PID aliases for each of the input data streams, means for removing at least one PID from each input data stream to thereby produce filtered data streams, means for determining a target destination for each of the filtered data streams, and a wagon wheel memory structure for buffering the filtered data streams so the filtered data streams can be read and transported to respective target destinations Where there are N filtered data streams, the wagon wheel memory structure preferably includes 2N time slots capable of accommodating corresponding write and read cycles for each of the N filtered data streams. The memory structure can also include pointers for the read-cycle and write-cycle time slots to assist data retrieval from the memory structure. Additionally, the inventive apparatus can also include any one or more of means for recovering the filtered data streams from the memory structure, and means for targeting any one of M data paths. In one preferred form of the invention, the inventive apparatus is an MPEG cross-point switch with incoming time-stamping capability for down-stream PCR correction.

Naturally, the above-described methods of the invention are particularly well adapted for use with the above-described apparatus of the invention. Similarly, the apparatus embodiments of the invention are well suited to perform the inventive methods noted above.

Numerous other advantages and features of the present invention will become apparent to those of ordinary skill in the art from the following detailed description of the preferred embodiments, from the claims and from the accompanying drawings.

BRIEF DESCRIPTION OF THE DRAWINGS

The preferred embodiments of the present invention will be described in detail below with reference to the accompanying drawings where like numerals represent like steps and/or structures and wherein.

DETAILED DESCRIPTION OF THE PREFERRED EMBODIMENTS

Figure 1:
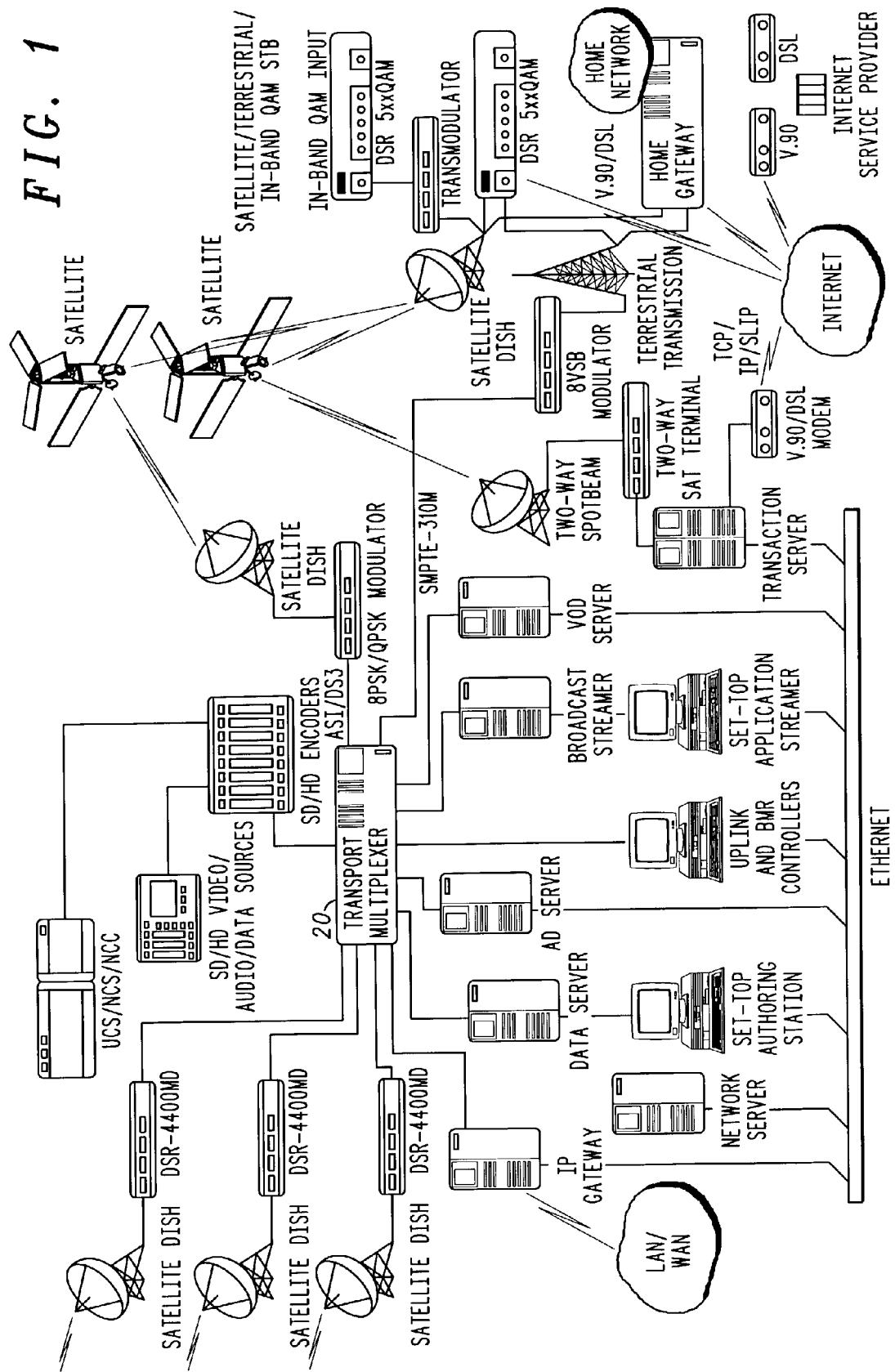
FIG. 1 is a diagram illustrating use of a transport multiplexer in accordance with the present invention, the BMR being shown in combination with various other equipment.

FIG. 1 is a high-level system diagram showing a representative application for an inventive TMX 20, TMX 20 being shown in combination with a control system and various other equipment. The TMX system can utilize, for example, Motorola Computer Group's (MCG) chassis, the CPX8216IP, or the customized CPX1205IP chassis for low end needs. The CPX8216IP is a 16 slot 12RU chassis while the CPX1205IP is a five slot 3RU chassis. One desirable feature of the CPX8216IP backplane is that it has two domains and, therefore, can be made to be completely 1:1 redundant. The CPX8216IP and CPX1205IP are compact PCI chassis. Both fit into an 18" deep rack, accept cards from the front and rear, and can be equipped with either AC or DC power supply modules.

Figure 2:
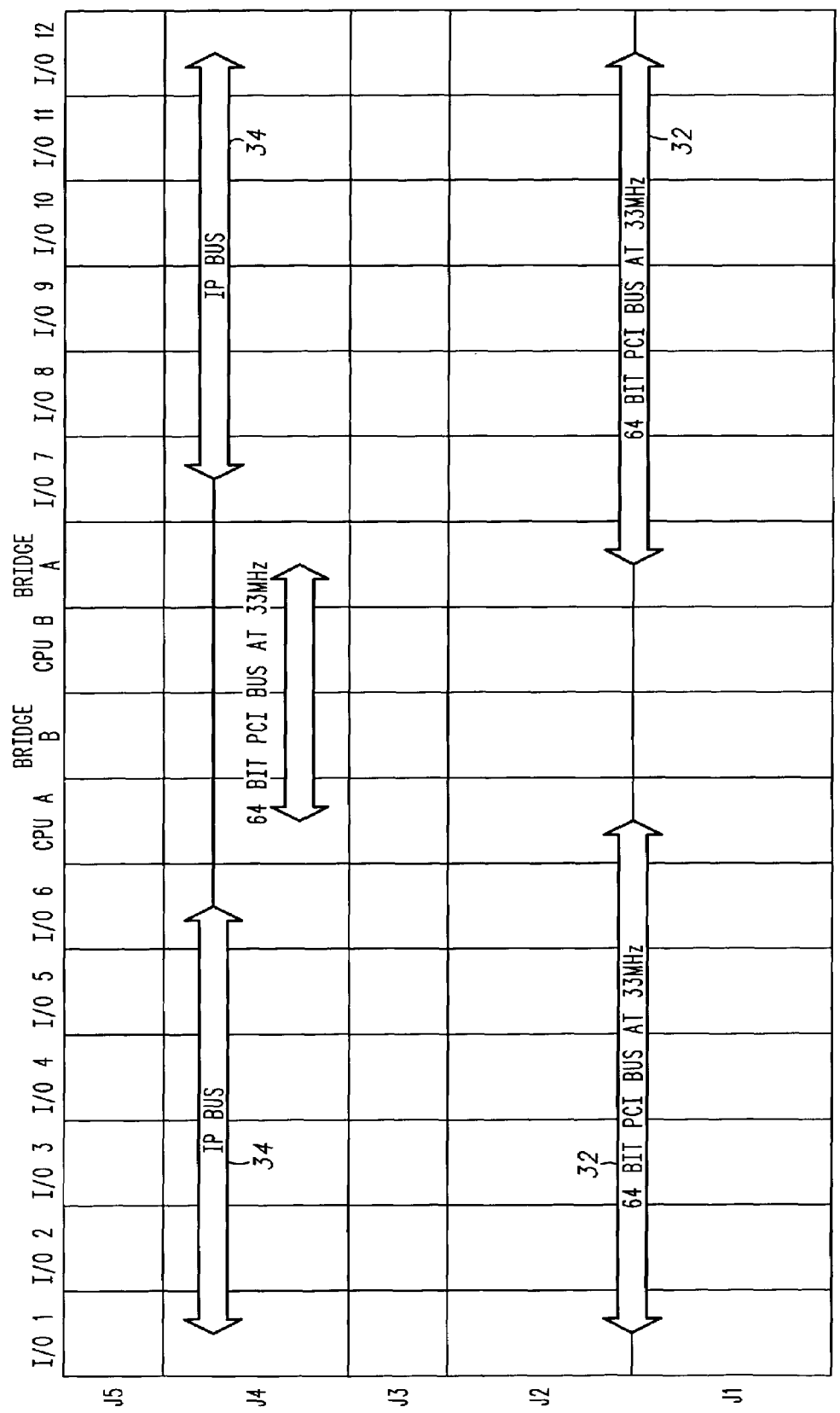
FIG. 2 is a diagram showing a representative data transport scheme for a TMX backplane in accordance with one embodiment of the invention.
Figure 3:
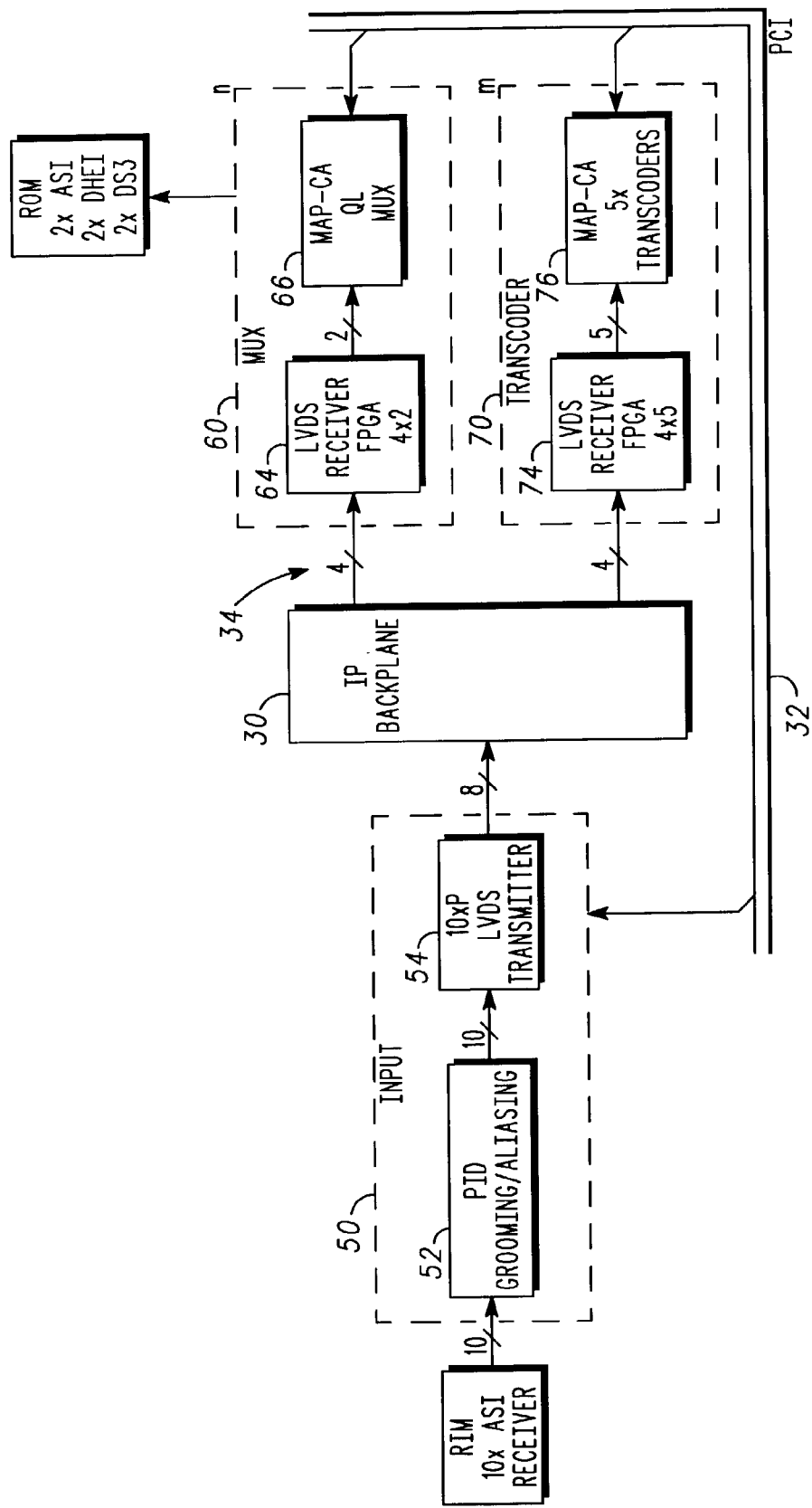
FIG. 3 is a block diagram showing the use of an Internet Protocol (IP) bus in a representative TMX in accordance with a preferred embodiment of the invention.
Figure 5:
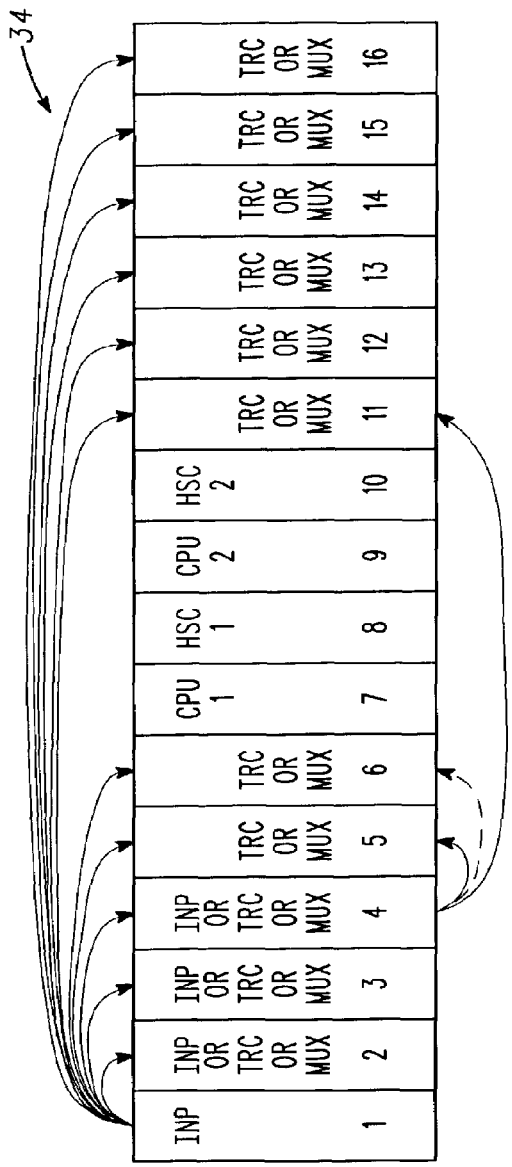
FIG. 5 illustrates the IP bus for the TMX of FIG. 3, and in particular the input (INP), transcoder (TRC) and/or multiplexer (MUX), central processing unit (CPU) and hot swap controller (HSC) boards in a large chassis.
Figure 7:
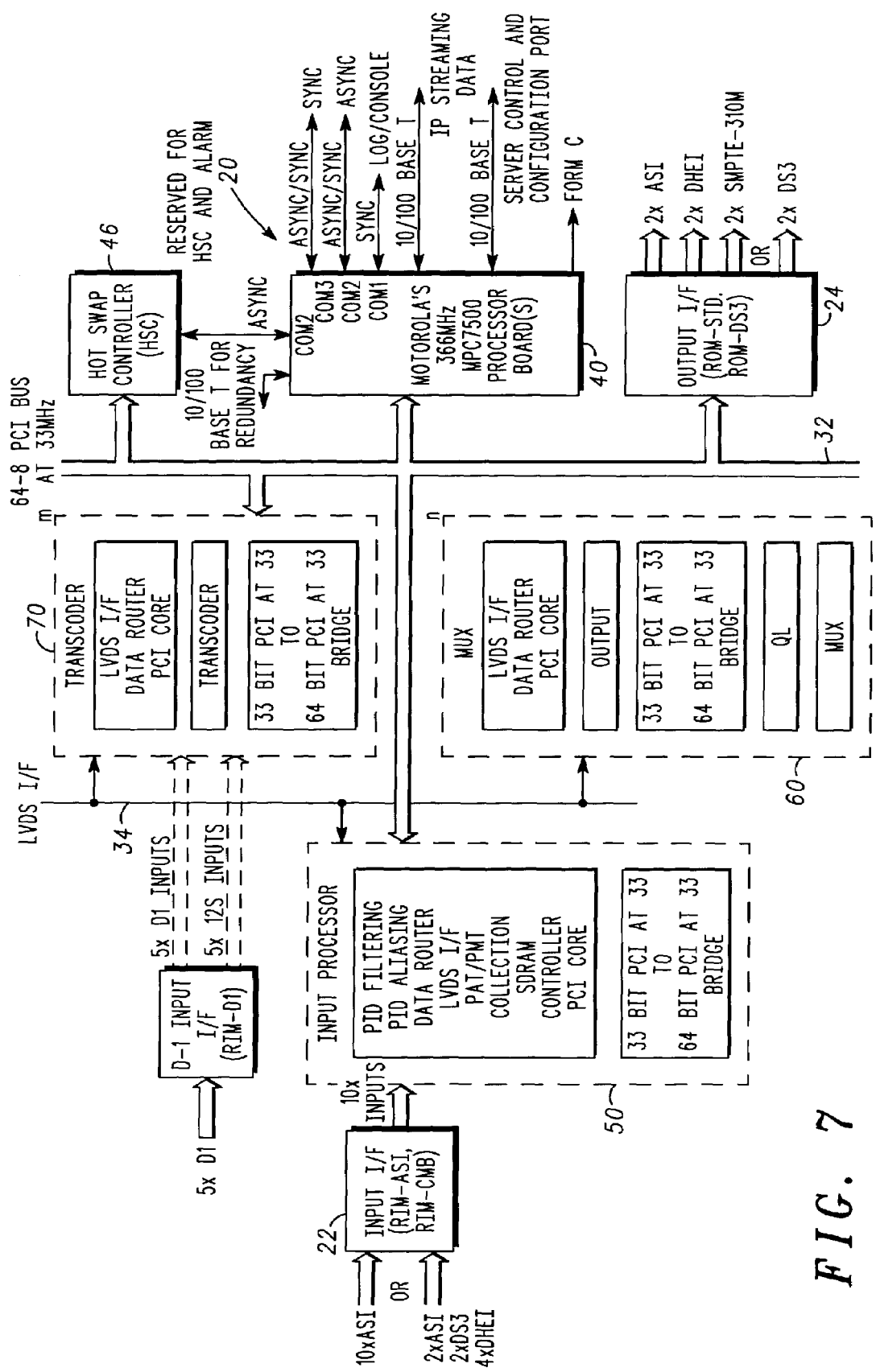
FIG. 7 is a high-level block diagram of a TMX in accordance with a preferred embodiment of the present invention.

As illustrated in FIGS. 2, 3 and 7, each of these chassis has a backplane 30 (or, more particularly, a special type of backplane known as a mid-plane) with two independent communication buses. These are (i) a compact PCI (cPCI) (bus 32), that is 64 bits wide and runs at 33 MHz; and (ii) a serial IP interconnect (bus 34). The IP bus 34 can be either a uni-directional or a bi-directional IP bus over which data can be sent and received from any board up to a rate of 1 GHz. As shown in FIG. 5, the four center slots of the 8216IP chassis preferably receive two host CPUs 40 and two Hot Swap Controller (HSC) cards 46. Alternative embodiments, such as that shown in FIG. 7, can use a single host CPU and a single HSC. The HSC card 46 serves two primary purposes: (i) to bridge the two PCI domains so as to appear as one twelve slot PCI bus (instead of two six slot PCI buses as is the case for redundancy); and (ii) to provide hot swap functionality.

Figure 6:
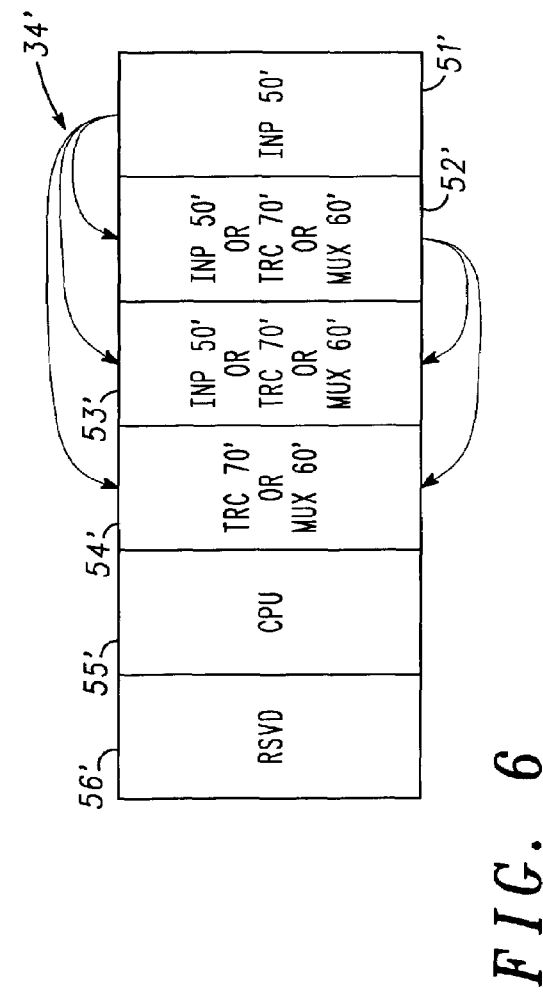
FIG. 6 summarizes the IP bus of FIG. 5 for a small chassis in accordance with an alternative embodiment of the present invention.

As noted above, each of the CPX8216IP and the CPX1205IP chassis has two independent communication pathways; namely, the cPCI bus 32 allowing for configuration and control, and the passage of compressed bitstreams to MUX 60; and the IP interconnect bus 34 over which incoming data can be distributed to any card such as representative Transcoder card (TRC) 70' or the MUX card 60'. In accordance with a preferred embodiment of the present invention, in order to route MPEG2 packets to any processor on any board, the IP interconnect bus 34 is preferably used to route MPEG2 packets. This is preferably accomplished by utilizing a family of devices called SerDes, which serialize and de-serialize data positioned at various locations in the system. For example, serializers and de-serializers, which incorporate clock recovery on the deserializer end, allow for a serial link across backplane 30 to pass data from board to board. However, the invention also envisions data transport between locations on a single board. A particularly preferred embodiment uses a serializer/deserializer pair whose serial link is a low voltage differential signal (LVDS). As indicated, e.g., in FIG. 6, the system will define fixed positions on backplane 30 which are capable of receiving an input card 50'. The remainder of the available slots or locations are preferably reserved for the TRC or MUX cards (70' and 60', respectively). Input board 50' will have serializers 54 installed, while the TRC and MUX cards (70' and 60') will have the de-serializers (74 and 64, respectively) installed. Any incoming packet can be routed to any target Media Accelerated Processor (MAP) (e.g., 66 or 76) on any target card. In order to control this flow of routing information, both aforementioned preferred chassis are capable of receiving a CPU card 40, e.g., a Motorola 750 PowerPC based CPU card (see especially, FIGS. 4 and 7). Those skilled in the art will appreciate that other implementations are also possible.

Figure 4:
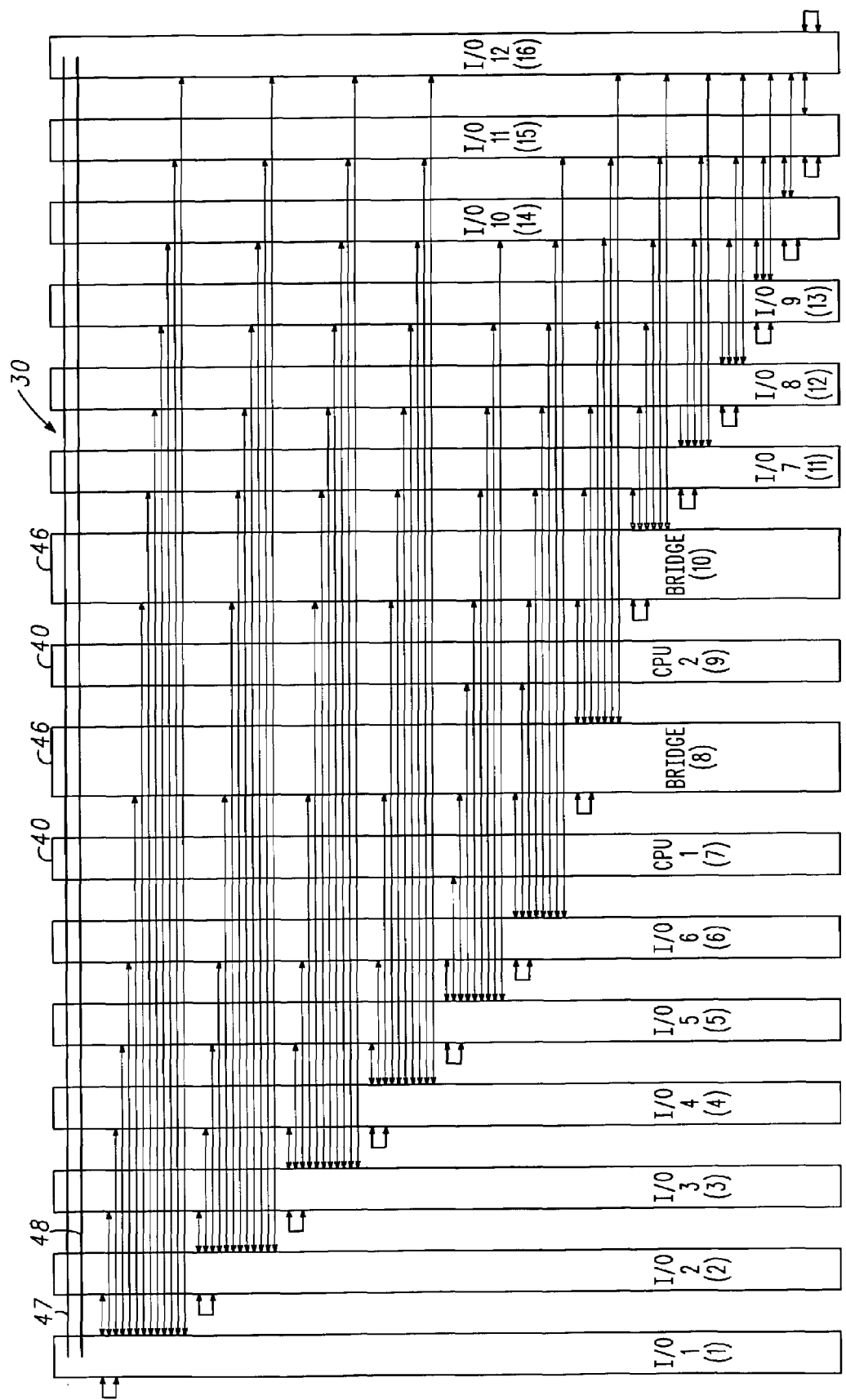
FIG. 4 is a diagram showing the IP routing on the connectors of the backplane used in the TMX of FIG. 2.

FIG. 4 is a diagram showing the IP routing on the connectors of the CPX8216IP backplane. As shown therein, each connection comprises two differential pairs; Receive (Rx) and Transmit (Tx) and there is a point-to-point connection for every slot, including itself Additionally, there are preferably two differential pairs across backplane 30 for distributing a common clock reference 47 and a sync signal 48 to every board to maintain system synchronization.

Since the 8216IP backplane was designed for Ethernet connectivity, only some of the available interconnects need to be utilized (namely the transmit lines) in the preferred embodiment This is due to the fact that one preferred architecture of the present invention passes data uni-directionally. To reduce cost, serial LVDS transmitters 54 and receivers 64 and 74 may be used instead of an Ethernet link. This also allows a higher payload data rate link of, e.g., 324 Mbps or 216 Mbps between boards versus only 75 Mbps for Ethernet. To further reduce cost, slots S1 through S4 may be dedicated for the input processor (INP) boards 50', as shown in FIG. 5, and the remaining slots S5–6 and S11–S16 can receive TRC or MUX boards 70' and 60' in the 8216IP chassis. Each INP board 50' preferably includes a plurality (e.g., eleven) LVDS transmitters 54, while each TRC or MUX board 70' or 60' preferably has a smaller number (e.g., four) LVDS receivers 74 or 64. The structure of TRC 70' is discussed in greater detail below, in connection with FIG. 13.

The backplane of the 1205IP chassis provides many of the features of the 81216 IP chassis discussed immediately above. For example, since the 1205IP backplane 30' of FIG. 6 was designed for Ethernet connectivity, only some of the available interconnects need to be utilized (namely the transmit lines) in the preferred embodiment. This is also due to the fact that the preferred architecture passes data uni-directionally. To reduce cost, serial LVDS transmitters 54 and receivers 74 or 64 may be used instead of an Ethernet link. This also allows a higher payload data rate link of, e.g., 324 Mbps or 216 Mbps between two boards. While slot S1' is preferably dedicated to receive the INP board 50', slot S2' or slot S3' can each receive one of an INP, TRC or MUX board (50', 70' or 60'). Finally, slot S4' receives either a TRC or MUX board 70' or 60'.

A high-level block diagram of a preferred TMX is provided in FIG. 7. The TMX can serve multiple applications, such as High Definition (HD) television and Standard Definition (SD) television, Add/Drop multiplexing, advertisement splicing, IP data processing and scrambling. The input signals 22 received by TMX 20 can be in a number of widely known and used formats. These input signal formats include, for example, ASI, DHEI and DS3. While the number and type of signal inputs and outputs that can be accommodated by the system are merely a matter of design choice, up to forty ASI inputs can be supported in the system when the aforementioned preferred chassis are utilized. The output data stream formats can be any combination of ASI, DS3, SMPTE-310M or DHEI.

Figure 8:
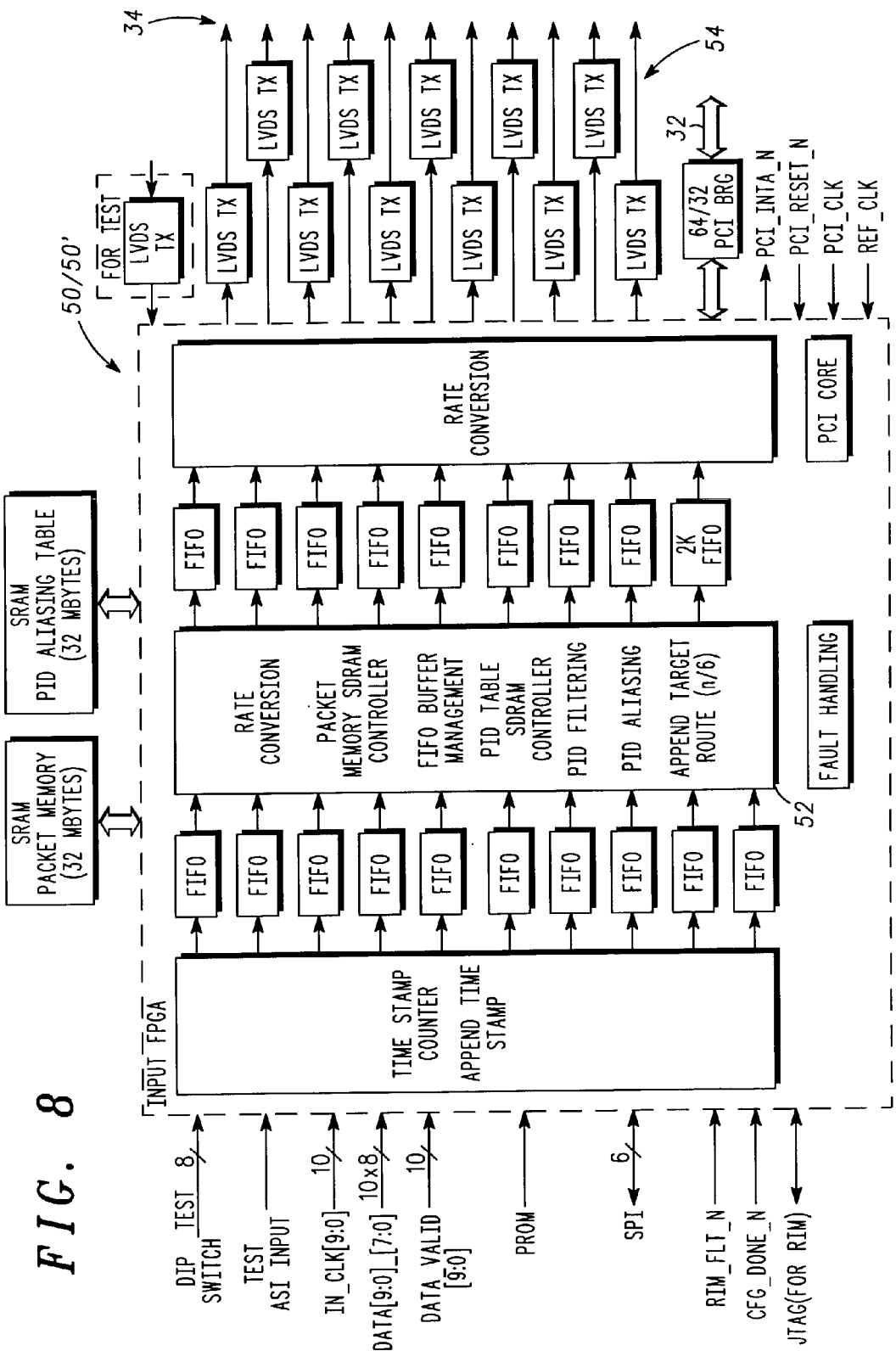
FIG. 8 is a block diagram of a representative input processor board that can be used in the TMX of FIG. 7.

A representative implementation of the input processor INP 50' is illustrated in FIG. 8. The input processor's (INP) 50 primary functions are to accept a plurality of data streams (e.g., up to ten MPEG data streams, preferably MPEG2), perform packet identifier (PID) filtering and aliasing, and to determine where to route the data streams for processing based on configuration data provided by the host CPU board. In the implementation shown in FIG. 8, the INP card 50' targets TRC's or MUX's via LVDS drivers and serial bus 34, and targets the CPU via the PCI bus. While typical incoming data packet lengths are 188 bytes. Out-going packets preferably have a length of 193 bytes and three components: 1 target MAP byte+a 188 byte packet of content data+a 4 byte time stamp. Representative supported data rates are 324 Mbps with a payload rate of 216 Mbps to each target MAP and/or MUX. Those skilled in the art will appreciate that other implementations are also possible.

Figure 9:
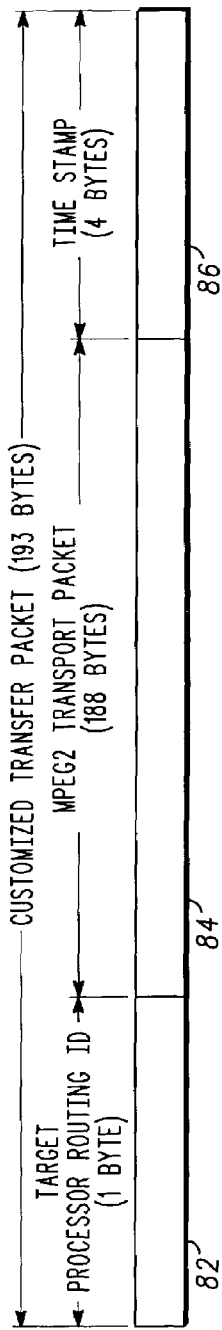
FIG. 9 illustrates a data packet configuration for use with a preferred embodiment of the invention, the packet having a routing header (1 byte), an MPEG2 packet (188 bytes) and a trailing time stamp (4 bytes)

Turning now to FIG. 9, this figure illustrates a preferred data packet configuration for use in the invention. In accordance with the invention, incoming data is filtered for null packets, and fed into a first-in-first-out (FIFO) for rate conversion before being written to the SRAM. In accordance with a preferred embodiment of the invention, a header and a footer are built on top of each content data packet (in the case of FIG. 9, an MPEG2 data packet) for routing and time stamping purposes. The header can, for example, be provided as the first byte of the 193 byte packet (Target Map byte) and is used to target a particular processor on a transcoder or multiplexer board receiving the data packets. The footer can, for example, comprise a four byte object which follows the content data packet and is used as a time stamp. This time stamp is processed at the receiving board to correct the program clock reference (PCR). Those skilled in the art will appreciate that other implementations are also possible.

Figure 10:
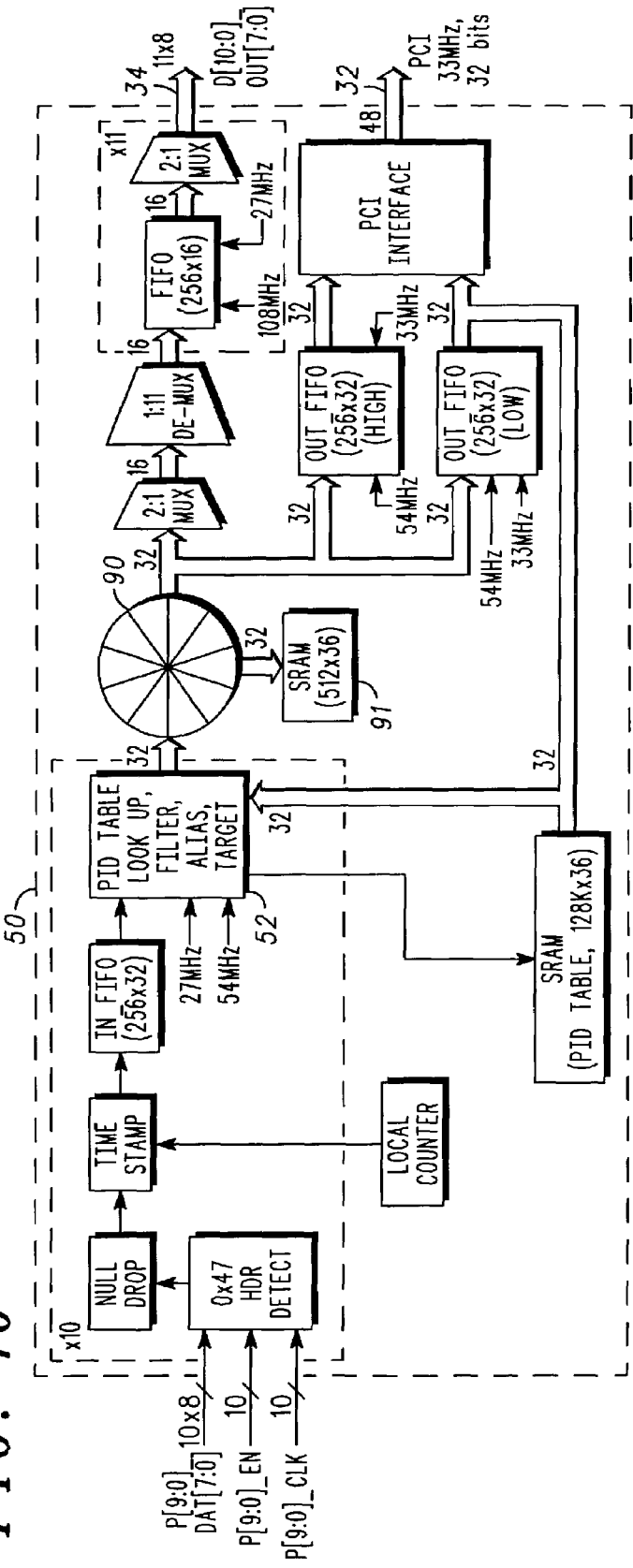
FIG. 10 is a functional block diagram of a field programmable gate array (FGPA) implementation of an input processor, this FGPA utilizing the TDM addressing scheme of FIG. 14.

FIG. 10 is a structural block diagram of a preferred input processor 50. While those skilled in the art will appreciate that other implementations are also possible, processor 50 is implemented as a field programmable gate array (FPGA) with a SRAM memory in this representative implementation. SRAM access in the embodiment of FIG. 10 runs at a preferred clock speed of 54 MHz. Table 1, shown immediately below, lists a number of input data rates are supported:

TABLE 1

| Number of INPUTS | Max Input Rate (Mbps) |
|---|---|
| 10 | 65.50 |
| 9 | 72.77 |
| 8 | 81.87 |
| 7 | 93.57 |
| 6 | 109.16 |
| 5 | 130.99 |
| 4 | 163.74 |
| 3 | 175.00 |
| 2 | 175.00 |
| 1 | 175.00 |

In the preferred FPGA, higher data rates can be achieved by not going through the wagon wheel 90 for all inputs where not all of the input ports receive signals. In such cases it is only necessary to go through the wagon wheel for each enabled input. The buffer size for each port can comprise, for example, 512 packets. Since each memory access is preferably 32 bits wide, and the SRAM preferably operates at packet boundaries, 196 bytes can be transferred during each read or write operation. Taking the case in which all ten inputs are active, it takes forty-nine 54 MHz cycles for a write operation, and fifty-four 54 MHz cycles for a read operation, times ten (1,030 cycles) to complete the wagon wheel, and to thereby write or read 196 bytes to/from the SRAM for each port.

Figure 11:
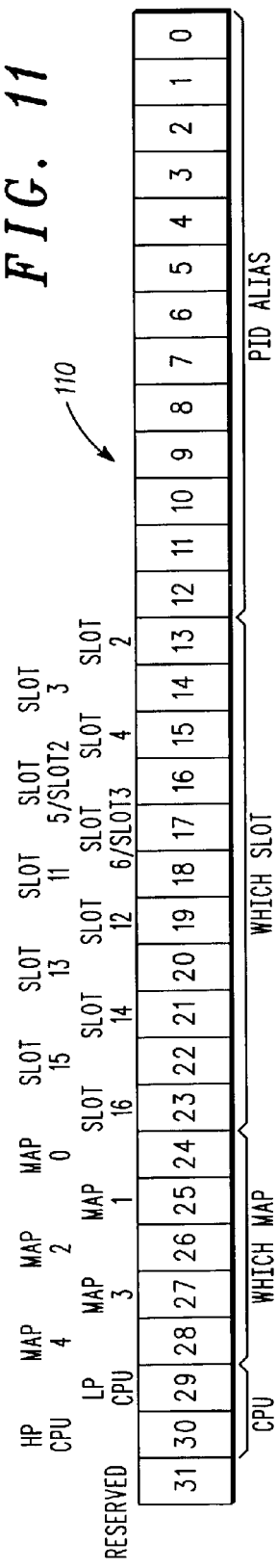
FIG. 11 illustrates a representative PID table for use with a preferred input processor of the invention.

When the data is read out of the packet memory SRAM, the PID Table SRAM is accessed to determine the PID alias, target board, and target MAP for the packet to be processed. The SRAM is configured by the CPU via the PCI bus. The definition of each address location is shown in FIG. 11 and discussed immediately below. The actual packet memory can be divided as shown in FIG. 12.

Turning now to FIG. 11, this figure illustrates an exemplary input board PID table 110 in accordance with the present invention. As shown, each entry in PID table 110 consists of high and low priority queues for the CPU, a MAP target, a slot target and the 13-bit MPEG2 packet PID alias. In operation, INP 50 uses this data to route packets through the broadband media router in any one of a number of ways. For example, data could be routed to location(s) within a single board or to at least one other board. Data could also be router to a single MAP or a number of MAPs (whether on a single board or on plural boards), and/or the CPU. Based on the disclosure contained herein, those skilled in the art will appreciate that other implementations and routing options are also possible.

Figure 12:
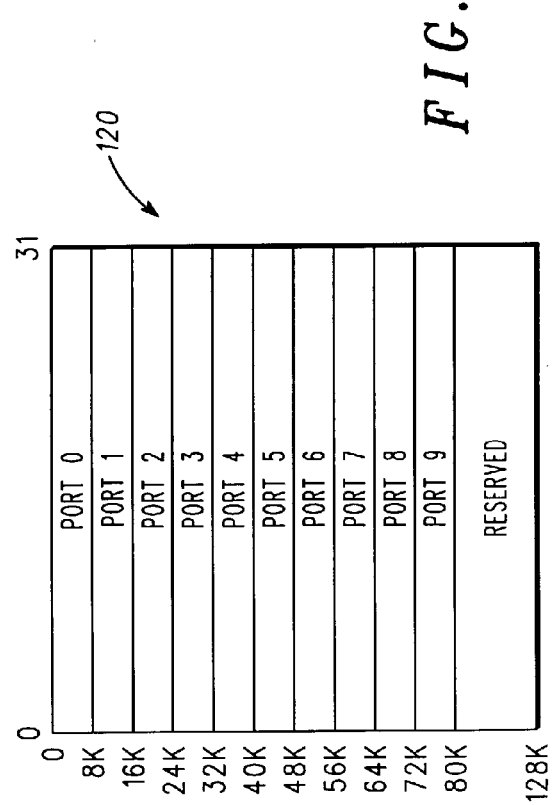
FIG. 12 shows an exemplary memory access scheme, along with memory partition, for the input processor of the invention.

A representative method 120 for accessing the memory device is shown along with memory partition, in FIG. 12. The memory access is the concatenation of the port number and PID number; Upper four bits for the port and 13 bits for the PID comprising a 17-bit address field. The data structure and content are shown in FIG. 11.

Figure 13:
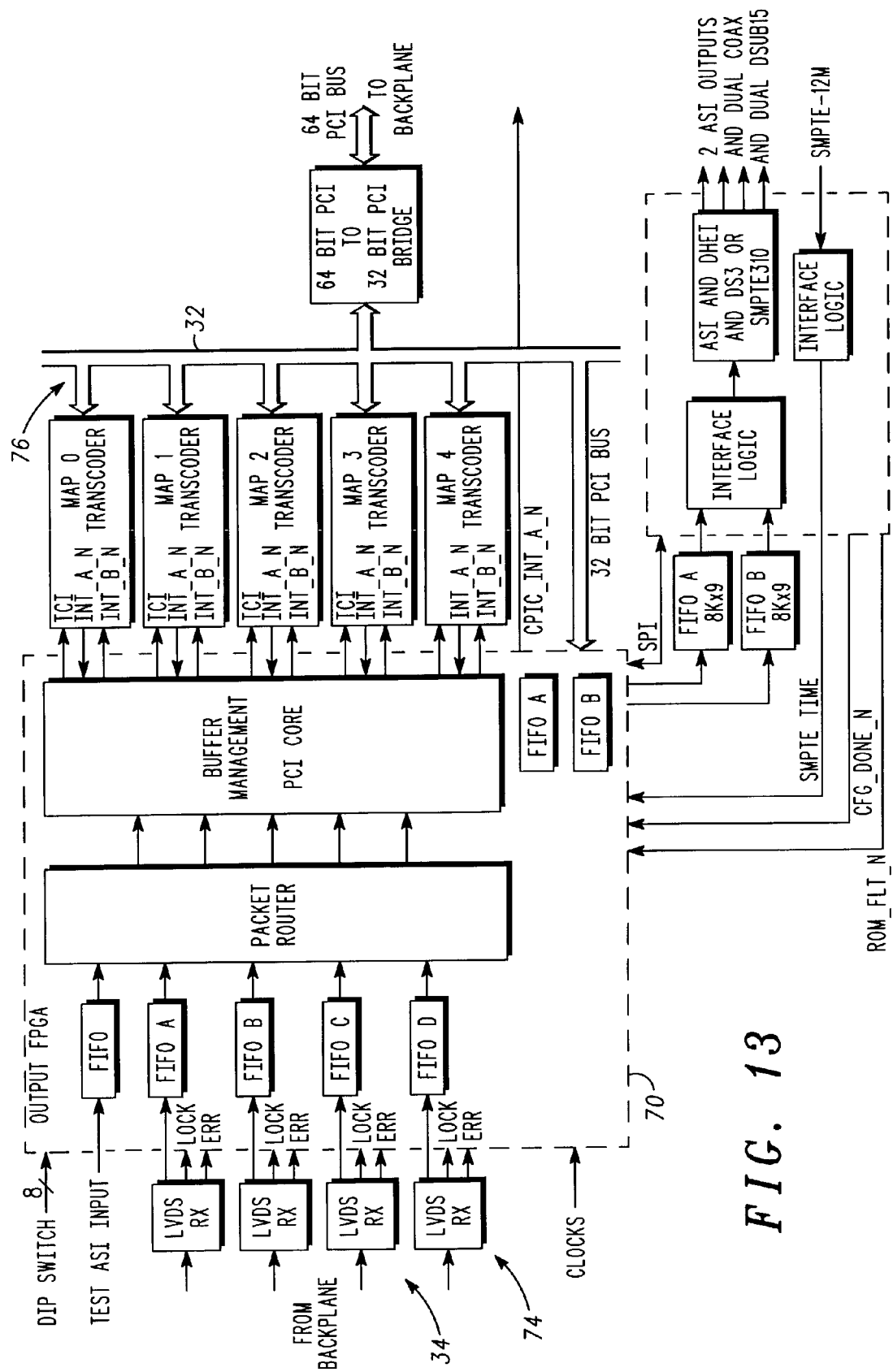
FIG. 13 is a block diagram of a transcoder board with Low Voltage Differential Signal (LVDS) receivers in accordance with a preferred embodiment of the invention.

A transcoder (TRC) 70 in accordance with one embodiment of the invention is illustrated in FIG. 13. As shown therein, a basic function of TRC 70 is to accept four LVDS data streams, and to send these streams to one of five MAP processors 76. In this embodiment, and as described above, data packets received by TRC 70 are preferably 193 bytes long; a one byte target MAP identifier, a 188 byte MPEG2 packet of content, and a four byte time stamp. In a particularly preferred embodiment, the TRC can be configured as a modified MUX card, based on special code written for such functionality being resident on one of the MAP processors of TRC 70, with the remaining four MAPs serving as transcoders. To reduce costs, TRC 70 can have a ROM connected to it. This enables the TRC to serve as the master clock to the entire system (thus driving the reference clock (27/4 MHz) to the backplane) and also the time stamp sync signal to synchronize all boards upon its terminal count. The DHEI frequencies and the 27 MHz are derived from the 44.736 MHz clock via a numerically controlled oscillators (NCOs). In an alternative embodiment, the TRC is not configured to be the master clock generator. In this alternative embodiment, the system would accept the 27/4 MHz clock from the backplane, along with the time stamp sync signal, and synchronize its time stamp counter to it.

With continuing reference now to FIG. 13, the MAP processors 76 shown therein will accept code download, configuration, quantization and provide status and buffer characteristics via the PCI Bus. Each of the MAP processors is capable of executing transcoding on video packets in accordance with a predetermined algorithm to thereby compress the outgoing data stream. In the preferred transcoder implementation of FIG. 13, the MAP buffer delays any associated audio or data elementary streams so they can be put together with the transcoded video data. In accordance with this feature of the invention, after the video has been transcoded (and other processing such as ad-insertion has been performed), the recombined bit stream is sent to the MUX MAP via the PCI.

Figure 14:
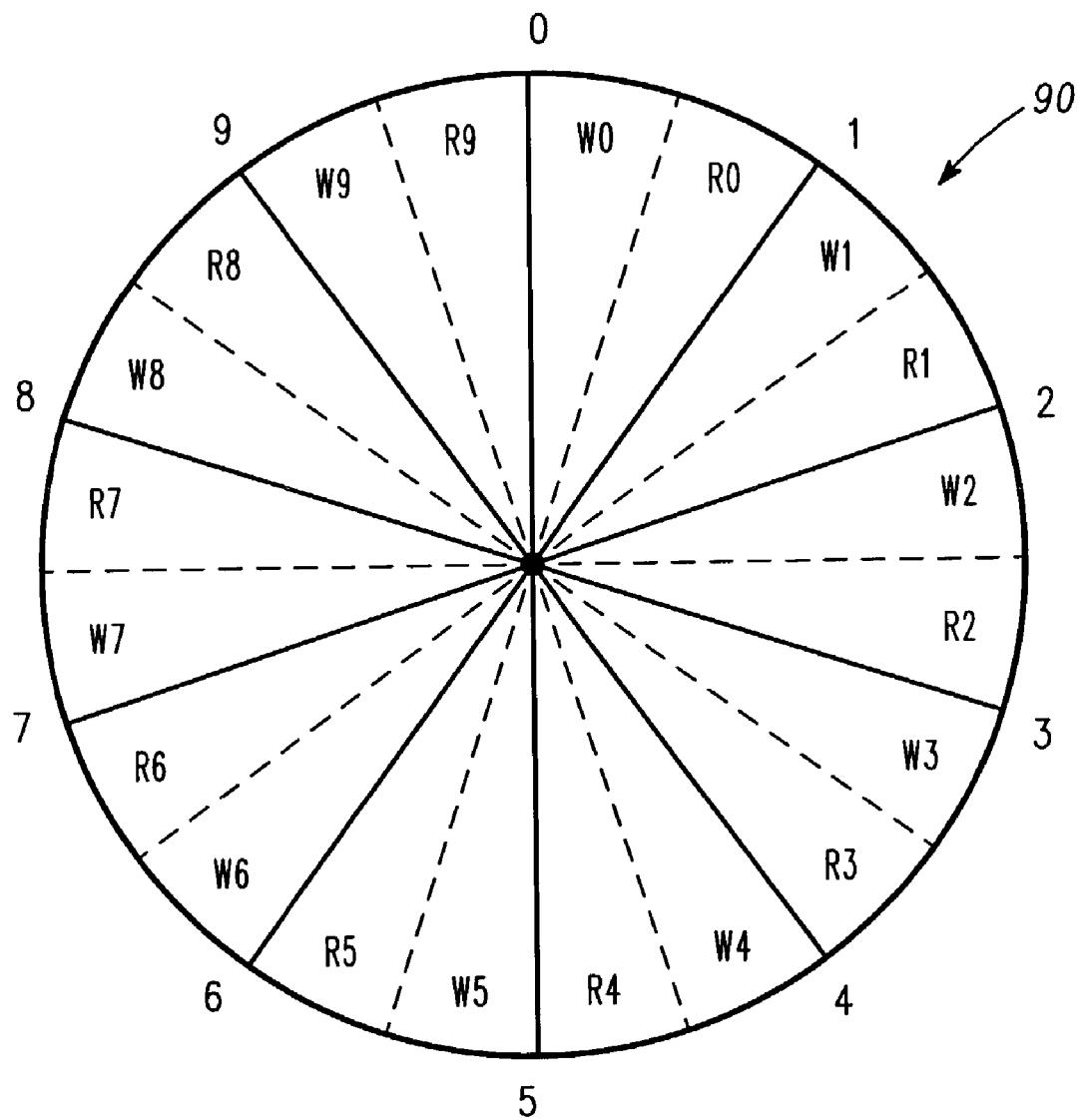
FIG. 14 illustrates a time division multiplexing (TDM) scheme that can be used to address input processor memory in accordance with the present invention.

As shown in FIG. 14, a time division multiplexing scheme is preferably utilized to access data from SRAM 91 of FIG. 10 to serve as a large buffer. This effectively divides the access to the SRAM into ten parts (one for each input port).

It should now be appreciated that preferred embodiments of the invention provide apparatus and methods for transporting digital packets, such as MPEG2 packets, between boards in a chassis using a serial differential protocol at a higher rate than was possible in the related art. The invention provides a solution to the problem of routing, e.g., MPEG2 packets efficiently to any target MPEG2 processing engine on any board across a backplane. The inventive solution obviates the related art requirements for custom backplane designs, together with discrete hardware, for sending parallel data between boards. Instead, the invention preferably uses a backplane architecture designed specifically for IP data traffic from any slot to any slot. Because routing of a plurality of data packets, such as MPEG2 packets (e.g., ten such packets), to any one or more desired destinations requires a large amount of bandwidth and memory management, the invention provides a hardware that uses a round robin scheme. In particular, two (or more) memory modules are utilized. One module can accommodate up to N PID aliases (where, for example, N=8192) for each of the plurality (e.g., ten) of packetized data (e.g., MPEG2) transport stream inputs. The second memory module provides for buffering of this data. Each of the plurality of inputs can be at its own varying rate, in which case the input data streams are synchronized to a common 27 MHz clock frequency. PID filtering is then applied to drop unnecessary PIDs and a look up for each PID's target destination is determined.

Data is preferably provided to the memory structure using a dedicated time slot for each of the (e.g., ten) inputs. After the data's PID is updated and target location determined, the data is fed into a wagon wheel type memory structure serving as a large buffer. Time is divided (e.g., into ten) for each of the incoming data paths, and then sub-divided into two for a write followed by a read cycle. Pointers are maintained for each read and write of the (e.g., ten) data paths. Writes are performed as 196 byte packets. This works out to forty-nine cycles for a 32 bit wide data bus running at 54 MHz.

When data streams are to be recovered from the memory module, respective ones of the read-cycle time slot are accessed (also at 54 MHz). The first four bytes that are read indicate the target slot and target data packet processing device on the target slot. Data is then preferably fed into a first-in-first out (FIFO) register, to convert the data back to 27 MHz rates, 8 bits wide. Then, the converted data is provided to an LVDS transmitter for serially transmitting the data streams which may, for example, be MPEG2 bit-streams. Outgoing packets preferably have a length of 193 bytes In one of the disclosed embodiments, a Motorola MCG 8216IP sixteen slot chassis is used to provide board-to-board data pathways. This preferred hardware solution allows packets to be sent from any one of plural input ports of an input board to any MPEG2 processing engine on any other board in the system. Low Voltage Differential Signal (LVDS) transmitters are provided on input boards, and LVDS receivers are provided on other boards. A header and a footer are preferably built on top of each data packet for routing and time stamping purposes. In the transcoder embodiment illustrated in FIG. 13, this header is provided in the first byte of a 193 byte packet and is used to target a particular one of the five processors on each transcoder board. The customized footer, which preferably comprises four bytes at the end of the entire 193 byte packet, provides a time stamp. This time stamp can be taken from a free running counter that is synchronized between the two cards (e.g., an input processor card and a transcoder card). At the receiving end, the first byte is used to route content to one of five processors on the transcoder board and is then dropped. The processor on the receiving board uses the time stamp in the last four bytes to correct the program clock reference (PCR). This hardware solution minimizes costs for the system as well as optimizes data transfer speeds, since one memory look-up at the input carries forward additional downstream routing in the MUX/TRC board. The chassis is preferably a modified compact PCI chassis, which can accommodate the IP interconnections and which uses the dedicated slot for serial inter-connections to thereby free up the PCI bandwidth for other important tasks.

While the present invention has been described in connection with what is presently considered to be the most practical and preferred embodiments, it is to be understood that the invention is not limited to the disclosed embodiments, but is intended to encompass the various modifications and equivalent arrangements included within the spirit and scope of the appended claims. With respect to the above description, for example, it is to be realized that the optimum dimensional relationships for the parts of the invention, including variations in size, materials, shape, form, function and manner of operation, assembly and use, are deemed readily apparent to one skilled in the art, and all equivalent relationships to those illustrated in the drawings and described in the specification are intended to be encompassed by the appended claims. Therefore, the foregoing is considered to be an illustrative, not exhaustive, description of the principles of the present invention.

What is claimed is:

1. A method of processing plural MPEG input data streams, the input streams each comprising a series of data packets and an associated PID, each data stream being transported to one or more target destinations, comprising:
generating a PID alias table which comprises plural PID aliases for each of the input data streams;
removing at least one PID from each input data stream to thereby produce N filtered data streams;
determining a target destination for each of the filtered data streams; buffering the filtered data streams employing such that the filtered data streams can be read and transported to respective determined target destinations, wherein said buffering employs a wagon wheel memory structure having 2N time slots to thereby accommodate corresponding write and read cycles for each of the N filtered data streams; and
sequentially populating write-cycle time slots of the wagon wheel memory structure with respective ones of the N filtered data streams.

2. The method of claim 1, further comprising maintaining a pointer for each read-cycle time slot and for each write-cycle time slot of the memory structure.

3. The method of claim 2, further comprising: recovering the filtered data streams from the memory structure;
and serially transporting the recovered data streams from a first board to a second board at the master clock rate via the backplane.

4. The method of claim 3, wherein recovering the filtered data streams comprises reading the filtered data streams from respective read-cycle time slots of the memory structure such that N data streams are recovered from the memory structure.

5. An apparatus for transporting plural MPEG input data streams with associated PIDs to multiple target destinations communicatively linked together, the apparatus comprising:
means for generating a PID alias table which comprises plural PID aliases for each of the input data streams;
means for removing at least one PID from each input data stream to thereby produce filtered data streams;
means for determining a target destination for each of the filtered data streams, and a wagon wheel memory structure means for buffering the filtered data streams such that the filtered data streams can be read and transported to respective determined target destinations,
wherein said wagon wheel memory structure has 2N time slots capable of accommodating corresponding write and read cycles for each of the N filtered data streams.

6. The apparatus of claim 5, wherein the wagon wheel memory structure further comprises pointers for each read-cycle time slot and for each write-cycle time slot of the memory structure.

7. The apparatus of claim 6, further comprising: means for recovering the filtered data streams from the memory structure; and means for serially transporting the recovered data streams.

8. The apparatus of claim 5 wherein the apparatus is a transport multiplexer capable of routing the input data streams to any one or more target destinations within a chassis.

9. The apparatus of claim 8 wherein the destinations are on a single processing board.

10. The apparatus of claim 8 wherein the destinations are on different boards that are communicatively linked together via a backplane.

* * * * *